Feb. 22, 1966  L. M. SIMPKINS  3,237,050
AUTOMATIC CONTROL DEVICE FOR VEHICLE LIGHTS
Filed April 10, 1963
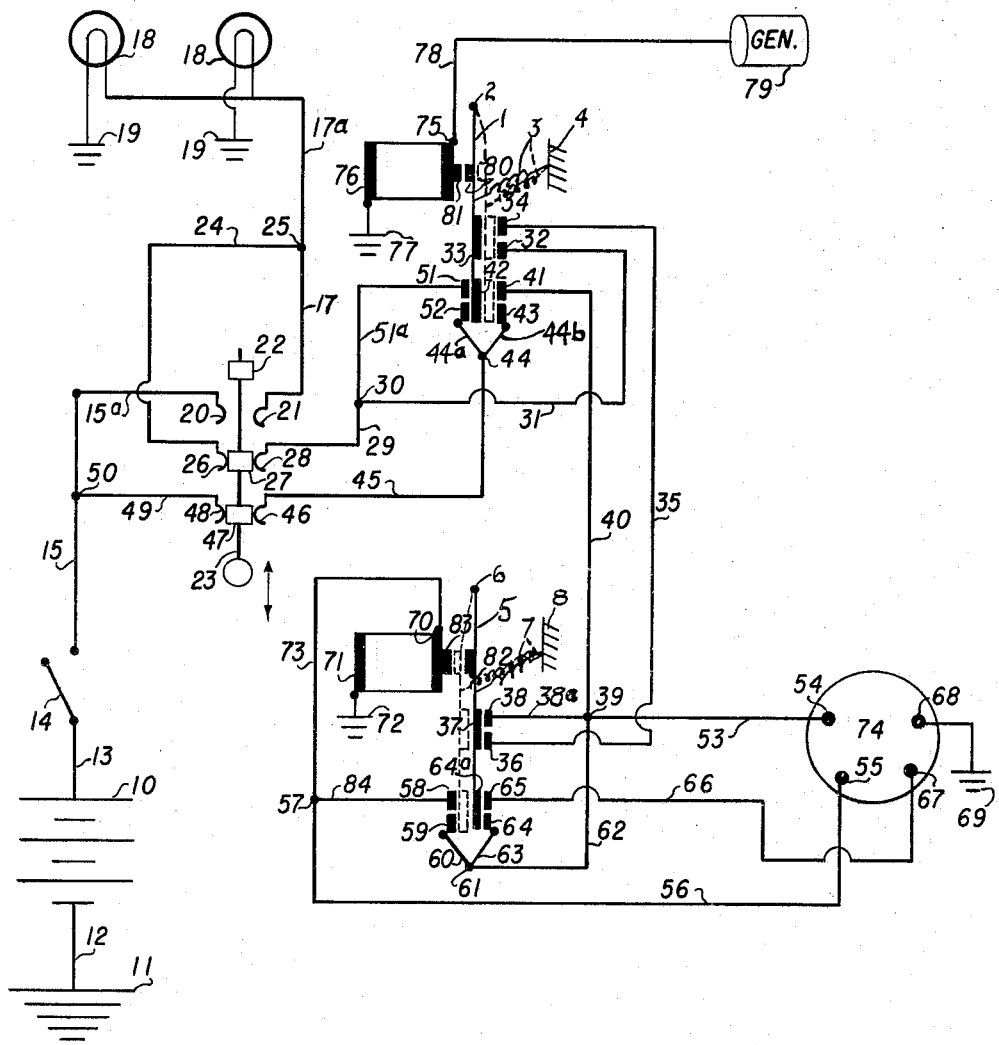
INVENTOR
LYLE M. SIMPKINS
BY
ATTORNEY

United States Patent Office 3,237,050
Patented Feb. 22, 1966

3,237,050
AUTOMATIC CONTROL DEVICE FOR
VEHICLE LIGHTS
Lyle M. Simpkins, 5401 2nd Ave.,
Sacramento, Calif. 95817
Filed Apr. 10, 1963, Ser. No. 272,101
5 Claims. (Cl. 315—82)

This invention relates to an automatic control for vehicle lights and is particularly directed to an improvement over my Patent No. 3,058,030 issued October 9, 1962.

A primary object of this invention is the provision of a device associated with the lights of a motor vehicle, particularly the headlights thereof, which will automatically, after a predetermined period, turn the same off in the event that they are accidentally turned on or left on unintentionally when the engine is not running.

A further object of the invention is the provision of a means which, in the event of accidental engine failure, will retain the headlights in illuminated condition for at least sufficient time to permit bringing the vehicle to a full stop, and then extinguish the headlights automatically.

Another object of this invention resides in the provision of circuitry which includes a switch controlled by the electrical current provided by an automobile generator to selectively energize and de-energize portions of the circuitry to automatically extinguish the lights when the engine is not running.

A further object of the instant invention is to provide a device of the character described which may be readily controlled by the operator of the vehicle with a minimum of effort and difficulty, and which may be cut in or out as desired, as for example, in the event of failure of any of the components of the control system.

A still further object of this invention is the provision of an automatic control device for vehicle lights which requires practically no moving parts and thereby insures reliability and efficiency in operation.

A further object of this invention is to provide a control device of the type described which is less expensive to manufacture, install and maintain than prior art constructions.

Other and further objects reside in the combinations of elements, arrangements of parts, and features of construction.

Still other objects will in part be obvious and in part be pointed out as the description of the invention proceeds and as shown in the accompanying drawing wherein:

The sole figure is a schematic wiring diagram showing the association of the control device of the instant invention with certain conventional components of a motor vehicle such as the battery, the generator, the lights and the light switch.

Similar reference characters refer to similar parts throughout the several views of the drawing.

Referring now to the drawing in detail, there is shown at 10 a conventional motor vehicle battery which is grounded at 11 through a conductor 12. A main circuit extends from the battery 10 to the lights of the vehicle indicated at 18 and grounded at 19 through the conventional two-position light switch 14, conductor 15, terminal 50, conductor 15a, conductor 17, terminal 25 and conductor 17a. A pair of spaced contacts 20, 21 are included in the main circuit and a contact closing switch member 22 forming part of a control switch 23 is adapted to bridge the contacts 20, 21 and thereby close the circuit to the lights 18 in the off or downward position of the switch 23 when the device of the instant invention is inoperative. With the control switch 23 in the position shown in the figure, the main circuit is opened and the lights 18 are controlled directly by the light switch 14 through the device of the instant invention as will be explained in further detail hereinafter.

The control switch 23 is manually operated and is preferably located at a convenient position adjacent the driver, either on the dashboard or under the same, or on the steering post, or in any other readily accessible location.

With the switch 23 in the position shown in the figure, direct communication from the battery 10 to the lights 18 is precluded by the position of the contact closing switch member 22. However, a first by-pass circuit forming a part of the automatic control device of the instant invention is formed through conductor 49, contact 48, a second contact closing switch member 47 on the control switch 23, contact 46, conductor 45, terminal 44, conductor 44a, point 52, bridging member 42 forming part of a first switch arm 1 pivotally mounted at 2, point 51, conductor 51a, terminal 30, conductor 29, contact 28, a third contact closing switch member 27, contact 26, conductor 24, terminal 25, and conductor 17a. The first switch arm 1 is movable between a first position shown in full lines in the figure and a second position shown in dotted lines, a spring means 3 secured to a portion 4 of the vehicle (not shown), normally biasing the same into the second position. A first coil means 76 is operatively connected to the generator 79 through a conductor 78 connected at 75, the first coil means 76 being grounded at 77. The first coil means 76 is energized when the generator 79 is operative, that is, when the engine of the vehicle is running, and a point 81 thereon attracts a point 80 on the first switch arm 1 to move the first switch arm 1 to the first position thereby bridging the points 51, 52 and closing the first by-pass circuit to illuminate the lights 18. As soon as the engine is stopped and the generator 79 becomes inoperative, the first coil means 76 is de-energized and the spring means 3 moves the first switch arm 1 to the second position thereby opening the first by-pass circuit and closing a second by-pass circuit formed by a conductor 44b connected to the terminal 44, a point 43, bridging member 42, point 41, conductor 40, terminal 39, conductor 38a, point 38, a bridging member 37 forming part of a second switch arm 5 pivotally mounted at 6, point 36, conductor 35, point 34, a second bridging member 33 on the first switch arm 1, point 32 and a conductor 31 connected to the terminal 30. The second switch arm 5 is normally biased to a first position shown in full lines in the figure by a spring means 7 secured to a portion 8 of the vehicle and movable to a second position shown in dotted lines in a manner to be more fully described hereinafter. Thus, even when the engine is shut off and the generator 79 thereby rendered inoperative, the lights 18 will receive power from the battery 10 through the second by-pass circuit if the conventional light switch 14 is closed.

A thermal relay means 74 is grounded at 69 and has a heating means defined between points 67 and 68 and a pair of normally spaced contacts 54, 55 which are closed in any conventional manner when their temperature is raised by the heating means. A first auxiliary circuit is provided to energize the heating means when the generator 79 is inoperative and the first switch arm 1 is in its second position. The first auxiliary circuit includes conductor 62 connected to the terminal 39, terminal 61, conductor 63, point 64, a second bridging member 64a forming part of the second switch arm 5, point 65 and conductor 66 connected to the point 67.

After a suitable delay to allow the heating means to close the contacts 54, 55, a second auxiliary circuit is closed to energize a second coil means 71 grounded at 72 and having a point 83 which attracts point 82 on the second switch arm 5 to move the same to its second position. The second auxiliary circuit includes a conductor 53 extending from the terminal 39 to the contact 54, a conductor 56 extending from the contact 55 to terminal 57, and conductor 73 connected to the second coil means 71 at 70.

When the second switch arm 5 is moved to its second position, the second by-pass circuit is broken by the bridge member 37 opening the same between the points 36, 38. At this time, the lights 18 receive no power and are automatically turned off. Concomitantly therewith, the second auxiliary circuit is opened by the bridge member 64a breaking the contact between points 64 and 65 and the heating means between points 67 and 68 is de-energized allowing the contacts 54, 55 to cool and open, breaking the second auxiliary circuit and removing this source of power to the second coil means 71. However, the bridging member 64a, when the second switch arm 5 is in its second position, establishes an auxiliary by-pass circuit to the second coil means 71 through conductor 60 connected to terminal 61, points 59 and 58, and conductor 84 connected to the terminal 57. Thus, the second coil means 71 will remain energized and will maintain the second switch arm 5 in its second position even though the contacts 54, 55 have opened on cooling.

The use and operation of the device of the instant invention will now be apparent. With the control switch 23 in the on position shown in the figure and the light switch 14 closed, the lights 18 will receive no power through the main circuit but will be illuminated during normal operation of the automobile by the first by-pass circuit, the first switch arm 1 being maintained in its first position shown in full lines in the figure by the first coil means 76 energized by the operative generator 79. As soon as the generator 79 is rendered inoperative by stopping the motor, the first coil means 76 is de-energized and the spring means 3 moves the first switch arm 1 to its second position shown in dotted lines in the figure. The lights 18 continue to receive power through the second by-pass circuit which is maintained closed by the second switch arm 5 being held in its first position shown in full lines in the figure by the spring means 7. At the same time the first auxiliary circuit is closed to energize the heating means between the points 67 and 68 in the thermal relay means 74 and after a predetermined time the contacts 54, 55 are closed to complete the second auxiliary circuit and energize the second coil means 71. This moves the second switch arm 5 to its second position shown in dotted lines in the figure thereby breaking the circuit to the lights 18 and turning them off while simultaneously de-energizing the heating means and closing the auxiliary by-pass circuit. This last-mentioned circuit maintains the second coil means 71 energized even after the contacts 54, 55 have opened due to cooling and the lights 18 remain off.

When the engine is again started thereby rendering the generator 79 operative, the lights 18 will immediately come on since the first coil means 76 will be energized to move the first switch arm 1 to its first position and close the first by-pass circuit. The lights 18 may also be turned back on for a short period by opening and immediately closing the conventional light switch 14. When the light switch 14 is open the second coil means 71 will be de-energized and the spring means 7 will move the second switch arm 5 to its first position. When the light switch 14 is again closed, the entire procedure will be repeated, the second by-pass circuit illuminating the lights 18, the first auxiliary circuit energizing the heating means, the contacts 54 and 55 closing after a predetermined time to complete the second auxiliary circuit and energize the second coil means 71 whereby the second switch arm 5 is again moved to its second position breaking the second by-pass circuit and the first auxilary circuit and completing the auxiliary by-pass circuit.

The automatic control device of the instant invention may be cut out of the circuitry to the lights 18 by moving the control switch 23 dowwardly until the contact closing switch member 22 bridges contacts 20, 21 and the contact closing switch members 27 and 47 are moved out of bridging engagement with the contacts 26, 28 and 46, 48, respectively. In this position the main circuit between the battery 10 and the lights 18 will be controlled only by the light switch 14 and the lights 18 will remain illuminated indefinitely if the switch 14 is closed.

It will now be seen that there is herein provided an automatic control device for vehicle lights satisfying all the objects of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. An automatic control device for a vehicle having an engine with a generator and a battery, a plurality of lights, a light switch and a main circuit including said light switch conductively connecting said battery to said lights, said device being adapted to extinguish said lights a predetermined time after stoppage of said engine and comprising a first by-pass circuit, a second by-pass circuit, a first auxiliary circuit, a second auxiliary circuit, and an auxiliary by-pass circuit, a control switch movable between an off position and an on position, means on said control switch closing said main circuit only in said off position, and additional means on said control switch closing said first and second by-pass circuits, said first and second auxiliary circuits, and said auxiliary by-pass circuit only in said on position, said first and second by-pass circuits conductively connecting said battery to said lights, a first switch arm movable between a first position and a second position, means operatively connected to said generator of said vehicle maintaining said first switch arm in said first position when said generator is operative, means to move said first switch arm to said second position when said generator is inoperative, means on said first switch arm maintaining said first by-pass circuit closed only when said first switch is in said first position, additional means on said first switch arm maintaining said second by-pass circuit, said first and second auxiliary circuits and said auxiliary by-pass circuit closed only when said first switch arm is in said second position, a thermal relay means, said first auxiliary circuit conductively connecting said battery to said thermal relay means to energize said thermal relay means, a second switch arm movable between a first position and a second position, means normally maintaining said second switch arm in said first position, means to move said second switch arm to said second position, said second auxiliary circuit conductively connecting said battery to said means to move said second switch arm to said second position when said thermal relay means is energized, means on said second switch arm maintaining said second by-pass circuit and said first auxiliary circuit closed only in said first position, said auxiliary by-pass circuit conductively connecting said battery with said means to move said second switch arm to said second position, and additional means on said second switch arm maintaining said auxiliary by-pass circuit closed only in said second position.

2. A device in accordance with claim 1 wherein said first switch arm is pivotally mounted and said means operatively connected to said generator include a first coil means energized by said generator when said generator is operative and maintaining said first switch arm in said first position when energized, said means to move said first switch arm to said second position when said generator is inoperative including spring means normally biasing said first switch arm to said second position.

3. A device in accordance with claim 1 wherein said second switch arm is pivotally mounted, said means normally maintaining said second switch arm in said first position including spring means.

4. A device in accordance with claim 3 wherein said thermal relay means includes a heating means and a pair of normally spaced contacts, said contacts closing when heated by said heating means and opening when cooled to ambient temperature, said first auxiliary circuit conductively connecting said battery to said heating means to energize said heating means and thereby close said contacts.

5. A device in accordance with claim 4 wherein said means to move said second switch arm to said second position includes a second coil means, said second auxiliary circuit conductively connecting said battery to said second coil means when said contacts in said thermal relay means are closed.

References Cited by the Examiner

UNITED STATES PATENTS 2,717,331   6/1955   Hollins _____ 315—77

GEORGE N. WESTBY, *Primary Examiner.*